United States Patent [19]

Oliver et al.

[11] Patent Number: 5,767,426

[45] Date of Patent: Jun. 16, 1998

[54] FERROMAGNETIC POWDER COMPOSITIONS FORMULATED WITH THERMOPLASTIC MATERIALS AND FLUORIC RESINS AND COMPACTED ARTICLES MADE FROM THE SAME

[75] Inventors: Christopher G. Oliver, Orange, Calif.; Sydney Luk, Cherry Hill, N.J.

[73] Assignee: Hoeganaes Corp., Riverton, N.J.

[21] Appl. No.: 818,149

[22] Filed: Mar. 14, 1997

[51] Int. Cl.$^6$ .................................................. B22F 3/00
[52] U.S. Cl. .................. 75/246; 75/231; 75/252; 75/253; 252/62.53; 428/928
[58] Field of Search .................. 75/230, 231, 252, 75/253, 246; 419/37; 252/62.53; 421/127; 427/221; 428/928

[56] References Cited

U.S. PATENT DOCUMENTS

| | | | |
|---|---|---|---|
| 3,836,355 | 9/1974 | Lindskog et al. | 75/2.52 |
| 3,935,340 | 1/1976 | Yamaguchi et al. | 427/216 |
| 4,093,449 | 6/1978 | Svensson et al. | 75/252 |
| 4,601,765 | 7/1986 | Soileau et al. | 148/104 |
| 5,063,011 | 11/1991 | Rutz et al. | 264/126 |
| 5,063,119 | 11/1991 | Ishida et al. | 428/894 |
| 5,198,137 | 3/1993 | Rutz et al. | 252/62.54 |
| 5,225,459 | 7/1993 | Oliver et al. | 523/220 |
| 5,256,185 | 10/1993 | Semel et al. | 75/255 |
| 5,268,140 | 12/1993 | Rutz et al. | 419/54 |
| 5,518,639 | 5/1996 | Luk et al. | 508/116 |

*Primary Examiner*—Ngoclan Mai
*Attorney, Agent, or Firm*—Woodcock Washburn Kurtz Mackiewicz & Norris LLP

[57] ABSTRACT

This invention presents, inter alia, novel iron-based powder compositions and compacted articles made from the same. The novel iron-based powder compositions of the invention are formulated with a fluoric resin, such as polytetrafluoroethylene, which provides powder mixtures with good flow properties and good uniformity. Compacted articles made from the novel iron-based powder compositions of the invention show reduced core losses and have good magnetic permeability over an extended frequency range. These compacted articles also exhibit high green density and good ejection characteristics.

16 Claims, 5 Drawing Sheets

FERROMAGNETIC POWDER COMPOSITIONS FORMULATED WITH THERMOPLASTIC MATERIALS AND FLUORIC RESINS AND COMPACTED ARTICLES MADE FROM THE SAME

FIELD OF THE INVENTION

This invention relates to novel iron-based powder compositions that are particularly useful, inter alia, for forming magnetic components. The iron-based powder compositions of the invention comprise an admixture of iron-based particles, a thermoplastic material, and a fluoric resin. These iron-based powder compositions produce compacts that exhibit reduced stripping and sliding forces and have excellent uniformity. Compacts made from the compositions of the invention have high green density, high magnetic frequency, and good permeability over an extended frequency range.

BACKGROUND

Typical powder metallurgical techniques have been used in the past to manufacture magnetic core components (referred to as iron-core or core components). However, these techniques, while efficient from the manufacturing standpoint, have often produced components whose electromagnetic or physical properties are not optimum. There is thus still a need for a powder metallurgical technique that can produce components with good physical and electromagnetic properties (i.e., magnetic permeability and core loss) without detrimentally affecting the core components' other properties (i.e., density or green strength).

Magnetic permeability is a measure of the ease with which a core component can be magnetized, or made to carry a magnetic flux. Permeability is the ratio of the induced magnetic flux to the magnetizing force or field intensity.

When a magnetic material is exposed to a rapidly varying field, the result is generally a loss of total energy from the core. In general, core loss should be minimized for maximizing energy efficiency. Core loss is defined as the power dissipated in the core as it is exposed to alternating magnetic fields; it can be expressed as the sum of hysteresis loss and eddy current loss. Hysteresis losses are brought about by the necessary expenditure of energy to overcome the retained magnetic forces within the iron-core component. Hysteresis loss can be described as the energy needed to sweep the domain walls. As a material is exposed to an alternating magnetic field, each cycle around the hysteresis loop requires a certain amount of energy. That energy is directly related to the area swept out by the hysteresis loop. The hysteresis loss is dependent upon the frequency of the application and the hysteresis loop area of the material and can be expressed as follows:

$$HysteresisLoss = K_H \, LoopArea \, f$$

where $K_H$ is a constant and f is the frequency of the varying magnetic field. Hysteresis loss can be decreased by reducing the hysteresis loop area of the material. Generally, the hysteresis loop area is reduced by lowering the coercivity.

The other component of core loss is known as eddy current loss. Eddy current losses are brought about by the production of electric currents in the iron-core component due to the changing flux caused by alternating current (AC) conditions. When a ferromagnetic material is exposed to an alternating magnetic field, electrical currents are induced within the material. The magnitude of these currents, often referred to as eddy currents, depends upon the frequency of the applied magnetic field, the resistivity of the ferromagnetic material, the induction level, and the ease with which these currents can circulate through the material. The result of these currents is an increase in heat generation within the core material. The contribution of the total loss in the core due to eddy currents is typically referred to as eddy current loss. A expression for eddy current loss is shown in the following equation:

$$EddyCurrentLoss = K_E \frac{d^2 B^2 f^2}{\rho}$$

where $K_E$ is a constant, d is the thickness of the material, B is the induction level, f is the frequency, and $\rho$ is the electrical resistivity of the ferromagnetic materials.

As total core loss is measured over a wide frequency range, the contribution of each component of loss to the total core loss changes. Since hysteresis loss and eddy current loss are functions of frequency to the first and second power, respectively, hysteresis dominates the low frequency loss and eddy currents dominate the high frequency loss. Attaining components with good electromagnetic properties (i.e., reduced core losses) is a concern of metallurgical techniques.

Early magnetic core components were made from laminated sheet steel. However, these core components were difficult to manufacture, experienced large core losses at higher frequencies, and exhibited excessive eddy current losses unless the magnetic flux was limited to the plane of the sheet, a constraint that limited the usefulness of such core components.

To overcome these deficiencies, magnetic core components made from sintered metal powders were investigated. These core components, however, also suffered from deficiencies. Components originally made using these methods exhibited high core losses and were primarily useful only in direct current (DC) operations, while most magnetic applications use alternating current (AC).

Magnetic core components for AC applications have been made by powder metallurgical methods using iron-based particles that are coated with a circumferential layer of insulating material to prevent or minimize core losses. See, e.g., U.S. Pat. Nos. 3,935,340 (use of a plastic coating on iron-based particles) and 4,601,765 (use of doubly-coated iron-based particles). However, because processing of such powder compositions generally requires relatively high levels of plastic binder, the pressed components often exhibit decreased green density and, consequently, decreased permeability. Further, compaction of such iron-powder compositions often required heating of the die or the composition itself, resulting in increased stripping and sliding pressures (ejection pressures), which in turn increases die wear.

Other methods of making magnetic core components using thermoplastics and iron-based particles are disclosed, for example, in U.S. Pat. Nos. 5,225,459; 5,268,140; 5,063,011; and 5,198,137. In these methods, a magnetic core component is made by die-pressing a powder composition of thermoplastic coated iron-based particles or an admixture of iron-based particles and thermoplastic particles, generally at a temperature exceeding the glass transition temperature of the coating material, and then annealing the pressed part at a temperature at least as high as the original pressing temperature. See, e.g., U.S. Pat. No. 5,268,140. Although the resulting core components have high density and acceptable physical and magnetic properties, the ejection forces associated with such methods can be high.

The use of lubricants, such as the metal stearates, in admixtures of iron-powders or on die walls is known to reduce the ejection forces experienced during compressing or molding techniques. However, the effectiveness of such lubricants is reduced at the high temperatures required for compressing or molding techniques. For example, at high temperatures such lubricants could impede the flow of powder compositions, and, consequently, adversely affect the pressed parts' density and uniformity.

A need therefore still exists in the art for homogeneous compositions of iron-based powders and insulating plastics that can be used to produce compacts with enhanced magnetic properties while retaining good physical properties of the compacts (such as density). The present invention addresses these as well as other needs by providing a composition of iron-based powders formulated with a thermoplastic insulating material and a fluoric resin. The compacts made from such compositions have high permeability through an extended frequency range, high pressed strength, reduced core losses, high green density, and good ejection characteristics.

SUMMARY OF THE INVENTION

The present invention provides novel iron-based powder compositions and compacted articles made from the same that are useful as magnetic components. The novel powder compositions of the invention comprise an admixture of iron-based particles and particles of an insulating thermoplastic material further formulated with a particulate fluoric resin. The fluoric resin imparts good flow properties to the composition and provides excellent lubricity, thus reducing strip and slide pressures (ejection forces) without sacrificing green strength or green density. In preferred embodiments, the thermoplastic resin is a polyetherimide and the fluoric resin is polytetrafluorothylene.

The compacts (magnetic core components) made from the compositions of the invention exhibit reduced core losses and good magnetic permeability over an extended frequency range. Articles made using the novel iron-based powder compositions of the invention are useful, inter alia, in applications that require components with high green strength and density and good electromagnetic properties, such as sensor rings for anti-lock brakes and certain components of automobile engines.

DETAILED DESCRIPTION OF THE INVENTION

Figure 1:
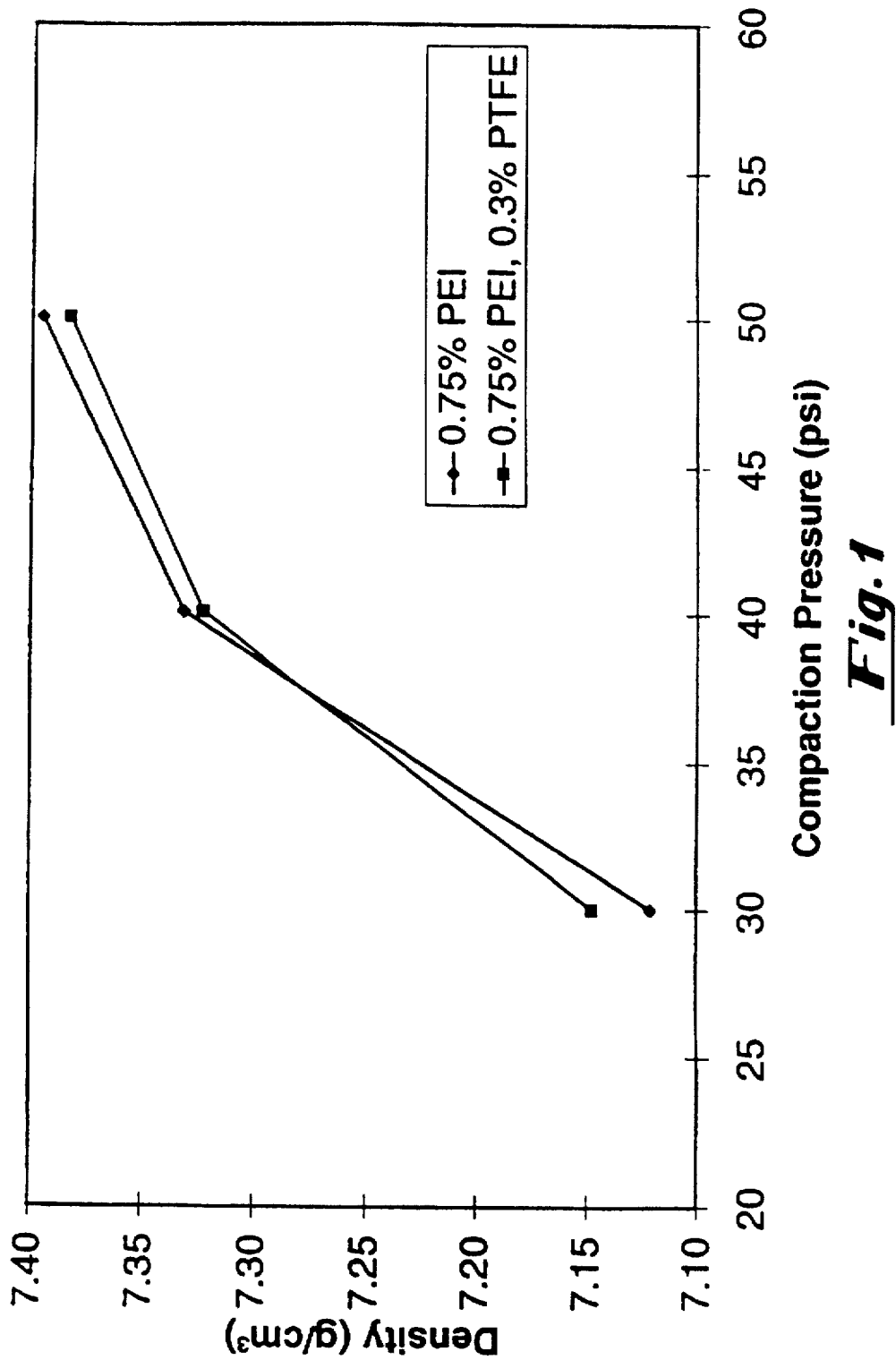
FIG. 1 is a graphical representation of the density, as a function of compaction pressure, of a compact made from an iron-based powder composition of the invention (described in Example 1) versus that of an iron-based powder composition formulated without PTFE. This graph demonstrates that the addition of small amounts of PTFE (0.3%) has little effect on the density of the compact.

The invention presents novel ferromagnetic powder compositions comprising an admixture A of iron-based particles and a thermoplastic material, in particulate form, wherein said thermoplastic material constitutes about 0.001 to about 15% by weight of the total weight of the admixture A, which is further admixed with a fluoric resin B, wherein said fluoric resin B constitutes about 0.001 to about 2.0% by weight of the total weight of the admixture A. The invention further provides compacted articles made from the novel ferromagnetic compositions of the invention.

The components of the novel ferromagnetic compositions are discussed in further detail below.

A. Component A

1. Iron-based Particles

The iron-based particles that are useful in the invention are any of the pure iron or iron-containing (including steel or ferromagnetic) particles generally used in powder metallurgical methods. Examples are particles of substantially pure iron and particles of iron pre-alloyed with other elements (for example, steel-producing elements) that enhance the strength, hardenability, electromagnetic properties, or other desirable properties of the final product. The particles of iron-based material useful in this invention can have a weight average particle size as small as one micron or below, or up to about 850–1,000 microns, but generally the particles will have a weight average particle size of about 10–500 microns. Preferred are iron-based particles having a weight average particle size of about 10–350 microns, and more preferred are particles having a weight average particle size of about 10–250 microns.

The preferred iron-based particles for use in the invention are highly compressible powders of substantially pure iron; that is, iron containing not more than about 1.0% by weight, preferably no more than about 0.5% by weight, of normal impurities. Examples of such metallurgical grade pure iron powders are the ANCORSTEEL 1000 series of iron powders available from Hoeganaes Corp., Riverton, N.J. A particularly preferred powder is ANCORSTEEL 1000C iron powder, which has a typical screen profile of about 13% by weight of the particles below a No. 325 sieve and about 17% by weight of the particles larger than a No. 100 sieve with the remainder between these two sizes (trace amounts larger than No. 60 sieve). The ANCORSTEEL 1000C powder has an apparent density of from about 2.8 to about 3.0 g/cm$^2$.

Other iron-based powders that are useful in practicing the invention include, but are not limited to, ferromagnetic or steel powders containing effective amounts of alloying elements pre-alloyed with the iron. Examples of good ferromagnetic materials are particles of iron pre-alloyed with small amounts of phosphorus. Other good ferromagnetic materials are blends of ferrophosphorus powders, such as iron-phosphorus alloys or iron phosphide compounds in powdered form, admixed with particles of substantially pure iron. Such powder mixtures are disclosed in U.S. Pat. Nos. 3,836,355 and 4,093,449, the disclosure of which are herein incorporated by reference in their entirety. Examples of steel powders are particles of iron pre-alloyed with one or more transition elements or other fortifying elements, such as molybdenum, nickel, manganese, copper, and chromium. Various pre-alloyed steel powders that can be used in the practice of this invention are available from Hoeganaes Corp. as part of its ANCORSTEEL line of steel powders.

2. Thermoplastic Material

Thermoplastic materials suitable for practicing this invention include, but are not limited to, any polymeric material that can act as an insulator and can be intimately admixed with the iron-based particles and sufficiently softened upon compaction as described herein so as to adhere or bond to the surfaces of the iron-based particles. The thermoplastic materials preferably have a weight average molecular weight of about 10,000 to about 50,000, more preferably a molecular weight of about 10,000 to about 50,000 and a glass transition temperature of about 175°–450° F. (~80°–230° C.). Examples of thermoplastic materials suitable for practicing the invention include, without limitation, polyetherimides, polyphenylene ethers, polyethersulfones, polycarbonates, polyethylene glycols, polyvinyl acetates, polyvinyl alcohols, or combinations thereof. Polyetherimides are preferred. Any such thermoplastic materials known to those skilled in the art can be used, however, without departing from the spirit of the invention.

A polyetherimide thermoplastic suitable for practicing the invention is poly[2.2'-bis(3.4-dicarboxyphenoxy) phenylpropane)-2-phenylene bismide], which has an empirical formula of $(C_{37}H_{24}O_6N_2)_n$ where n is an integer of about 15–27. The polyetherimide thermoplastics generally have a specific gravity of about 1.2 to about 1.6. A commercially available polyetherimide is sold as ULTEM resin by the General Electric Company. The most preferred ULTEM resin is the ULTEM 1000 grade. Any such polyetherimides known to persons skilled in the art may be used without departing from the spirit of the invention.

Suitable polycarbonates that can be utilized as a thermoplastic in the present invention include, without limitation, bisphenol-A-polycarbonates, also known as poly(bisphenol-A-carbonate). These polycarbonates generally have a specific gravity of about 1.2 to about 1.6. A specific example is poly(oxycarbonyloxy-1,4-phenylene-(methylethlidene)-1,4-phenylene), which has an empirical formula of $(C_{16}H_{14}O_3)_n$ where n is an integer of about 30–60. Commercially available polycarbonates are the LEXAN resins from General Electric Company. The most preferred LEXAN resins are the LEXAN 121 and 141 grades. Any such polycarbonates known to persons skilled in the art may be used without departing from the spirit of the invention.

A polyphenylene ether thermoplastic suitable for practicing the invention is poly(2,6-dimethyl-1,4-phenylene oxide), which has an empirical formula of $(C_8H_8O)_n$ where n is an integer of about 30–100. The polyphenylene ether homopolymer can be admixed with an alloying/blending resin such as a high impact polystyrene (i.e., poly(butadiene-styrene) and a polyamide (i.e., Nylon 66, either as polycaprolactam or poly(hexamethylenediamine-adipate)). These thermoplastic materials generally have a specific gravity of about 1.0 to about 1.4. A commercially available polyphenylene is sold as NORYL resin by the General Electric Company. The most preferred NORYL resins are the NORYL 844, 888, and 1222 grades. Any such polyphenylene ethers known to persons skilled in the art may be used without departing from the spirit of the invention.

A suitable polyethersulfone thermoplastic has the general empirical formula of $(C_{12}H_{16}SO_3)_n$, where n is an integer of about 50–200. An example of a suitable polyethersulfone for practicing the invention is commercially available as VICTREX PES by ICI, Inc. The most preferred of these resins is the VICTREX PES 5200 grade. Any such polyethersulfones known to persons skilled in the art may be used without departing from the spirit of the invention.

Generally, the thermoplastic material is in the form of particles, which are preferably spherical but can be, for example, lenticular or flake-shaped. The particles are preferably fine enough to pass through a No. 60 sieve, U.S. Series (about 250 microns or less), more preferably fine enough to pass through a No. 100 sieve (about 150 microns or less), and even more preferably fine enough to pass through a No. 140 sieve (about 105 microns or less). The absolute particle size of the thermoplastic particles is less important, however, than their size in relation to the size of the iron-based particles. It is preferred that the thermoplastic particles generally be finer than the iron-based particles.

B. Component B

Fluoric resins B suitable for practicing this invention will generally have a number average molecular weight of about 400,000 to about 12 million, more preferably about 500,000 to about 6 million, and even more preferably about 2 million to about 4 million. Examples of fluoric resins suitable for practicing the invention include, but are not limited to, polytetrafluoroethylene (PTFE), tetrafluoroethylene, hexafluoropropylene co-polymers (DuPont Teflon - FEP), polyvinylidene fluoride (PVF), fluorinated ethylene propylene (FEP), perfluoralkoxy resin (PFA), ethylene-chlorotrifluoroethylene co-polymer (ECTFE) and ethylene-tetrafluoroethylene co-polymer, and combinations thereof. Polytetrafluoroethylenes (PTFE) are preferred. PTFEs suitable for practicing the invention include, without limitation, Zonyl MP 1100 available from DuPont, FLUO HT available from Micro Powers Inc., and Algoflon® available from Ausimont, with Zonyl MP 1100 being preferred.

Generally, the fluoric resin is provided in particulate form. Preferably, the particle size of the fluoric resin is about 1 to about 50 microns, more preferably about 2 to about 30 microns, and even more preferably about 3 to about 10 microns. This particle size refers to the absolute particle size and can be determined by ASTM D4894. Any fluoric resins possessing the above properties known to those skilled in the art may be used without departing from the spirit of the invention.

C. Preparation of the Novel Compositions of the Invention

Generally, the compositions of the invention can be made by admixing the iron-based particles and thermoplastic particles, preferably in dry form, using conventional mixing techniques to form a substantially homogeneous, intimate admixture of the iron-based and thermoplastic particles (Component A). The fluoric resin (Component B) is then admixed with Component A in a dry state using conventional mixing equipment. Examples of suitable mixing equipment are the conical screw mixers available from the Nauta Company.

A particularly preferred composition of the invention can be made as follows: Ancorsteel 1000C iron powder and PEI-140 mesh powder (0.75% by weight of the total weight of admixture A) are mixed together. PTFE powder (0.3% by weight of the total weight of admixture A), having a particle size of about 3 to about 10 microns, is then dry blended with the iron-based particles and the thermoplastic material for about 20 minutes using conventional techniques.

The amount of thermoplastic material present in the ferromagnetic composition is generally about 0.001% to about 15% by weight of the total weight of Component A. Preferably, the thermoplastic material is about 0.2% by weight to about 5% by weight, more preferably about 0.25% to about 2% by weight, and most preferably about 0.25% to about 0.75% by weight, based on the total weight of Component A. Also suitable are combinations such as PTFE (about 0.1% by weight based on the total weight of Component A) and ULTEM (about 0.25% by weight based on the total weight of Component A).

The amount of fluoric resin present in the ferromagnetic composition is generally about 0.001% to about, 1.5% by weight of the total weight of Component A. Preferably, the fluoric resin is about 0.05% to about 1% by weight, more preferably about 0.05% to about 0.75% by weight, and most preferably about 0.1% to about 0.6% by weight, based on the total weight of Component A. A particularly preferred composition contains about 0.3% by weight of the fluoric resin, based on the total weight of the admixture (Component A), when the admixture contains about 0.75% by weight of the thermoplastic material. A preferred composition comprises a mixture of about 0.1% PTFE and 0.25% ULTEM, based on the total weight of the admixture A.

D. Other Additives

The iron-based particles can first be coated with an additional insulative inorganic material. Coatings suitable for this use include, but are not limited to, iron phosphate, such as disclosed in U.S. Pat. No. 5,063,011, the disclosure of which is herein incorporated by reference in its entirety; and alkaline metal silicates, such as disclosed in U.S. Pat. No. 4,601,765, the disclosure of which is herein incorporated by reference in its entirety. The coating may be about 0.1 to about 0.4% by weight, preferably about 0.1 to about 0.3% by weight, and more preferably no greater than about 0.2% by weight based on the total weight of the premix (i.e., iron+ULTEM+PTFE).

A solid lubricant, usually in an amount up to about 1% by weight based on the total weight of the admixture A, can be mixed into the composition of the invention. Alternatively, the lubricant can be applied directly on the die wall. Examples of suitable lubricants include, without limitation, the metal stearates (i.e., zinc stearate), synthetic waxes (i.e., waxes available from Glycol Chemical Co. as ACRAWAX synthetic wax), or fatty acids (i.e., stearic acid). Another lubricant that can be admixed directly with the ferromagnetic composition of the invention is boron nitride, as disclosed in U.S. Pat. No. 5,198,137. Any other lubricants known to those skilled in the art may be used without departing from the spirit of the invention.

E. Preparation of Magnetic Core Components

The iron-based compositions of the invention can be formed into magnetic core components using appropriate molding or compressing techniques. Preferred is compression molding, in which the powder composition is charged into a die and heated to a temperature above the glass transition temperature of the thermoplastic material before compaction. The composition can be heated before introducing it into the die, or the die can be preheated before receiving the composition. A combination of these steps can also be used. It is preferred that the composition be at a temperature about 25°–85° C. above the glass transition temperature of the thermoplastic material before compaction. Normal powder metallurgy pressures are applied at the indicated temperatures to press out the desired component. Typical compression molding techniques employ compaction pressures of about 5 to about 100 tons per square inch (tsi) (69–1379 MPa), more preferably about 20 to about 75 tsi, and even more preferably about 30 to about 60 tsi (414–828 Mpa). The temperature and pressures used in the compression molding step are generally those that will be sufficient to form a strong integral part from the powder composition, and could be readily discerned by those skilled in the art.

Following the compaction step, the component can optionally be further heat treated. According to this procedure, the component, preferably after removal from the die and after being permitted to cool to a temperature at least as low as the glass transition temperature of the thermoplastic material, is separately heated to a "process" or annealing temperature that is above the glass transition temperature of the thermoplastic material. The process temperature is preferably up to about 140° C. above the temperature at which the component was compacted, more preferably 290° C., with the temperature being controlled below the flash point of the thermoplastic material. The component is then maintained at the process temperature for a time sufficient for the component to be thoroughly heated and its internal temperature to be brought substantially to the process temperature. Generally, heating is required for about 5 minutes to about 24 hours, preferably about 15 minutes to about 8 hours, and more preferably about 30 minutes to about 3 hours, depending on the size and initial temperature of the pressed part. The heat treatment can be conducted in air or in an inert atmosphere such as nitrogen. These conditions can be readily determined by persons skilled in the art.

The heat treatment is a separate heating step from the compaction process. It has been found, however, that the performance of the heat treatment step can occur at any time after compaction. That is, the heat treatment step can be done immediately after compaction with no intervening cooling, or it can be done after compaction, after the component has cooled or been permitted to cool to a temperature at least as low as the glass transition temperature of the thermoplastic material, and, optionally, as low as ambient temperature. Such post-compaction heat treatment procedures are described in U.S. Pat. No. 5,268,140, the disclosure of which is herein incorporated by reference in its entirety.

The iron-based powder compositions of the invention produce homogeneous compacts having high green density, reduced core losses, and good magnetic permeability over an extended frequency range. It is believed that a presence of the fluoric resin, such as PTFE, in the iron-based powder composition contributes to homogenicity and enhanced flow properties of the powder compositions, which in turn yield compacts having the above-described properties.

The following examples describe compositions of the invention and comparative compositions. These examples are intended only for illustrative purposes and are not intended to limit the invention in any way.

EXAMPLES

General Experimental

The properties of the various components of the metallurgical powders and the powders themselves can be determined according to conventional methods, as indicated, for example, in the following chart.

| Specific Gravity | ASTM D792 |
| --- | --- |
| Chemical Resistance | ASTM D543 |
| Solvents Resistance | ASTM D543 |
| Dielectric Constant | ASTM D150 |
| Dissipation Factor | ASTM D150 |
| Volume Resistivity | ASTM D257 |
| Friction Coefficient | ASTM D1894 |
| Particle Size | ASTM D4894 |
| Density | ASTM B331 |
| Magnetic Field Strength | ASTM A773 |
| Magnetic Permnability | ASTM A773 |
| Core Loss | ASTM A927 |
| Magnetic Field Strength | ASTM A773 |
| Magnetic Flux Density | ASTM A772 |
| Magnetic Flux | ASTM A773 |

EXAMPLE 1

A mixture of a composition of the invention was made comprising 0.75% by weight of PEI-140 mesh powder (weight % is based on the total weight of the iron-based particles and the thermoplastic material Component A) supplied by GE Plastics and Ancorsteel 1000C iron powder from Hoeganaes Corp. The mixture was divided into two portions; to one of the portions was added 0.3% by weight, based on the total weight of the iron-based powder particles and thermoplastic material, of PTFE powder supplied by DuPont, having an average particle size of about 3 to about 10 microns. Each of the two compositions, the one with PTFE (Mixture 1) and the one without PTFE (Mixture 2) was further mixed for about 20 minutes using a double cone blender.

Figure 2:
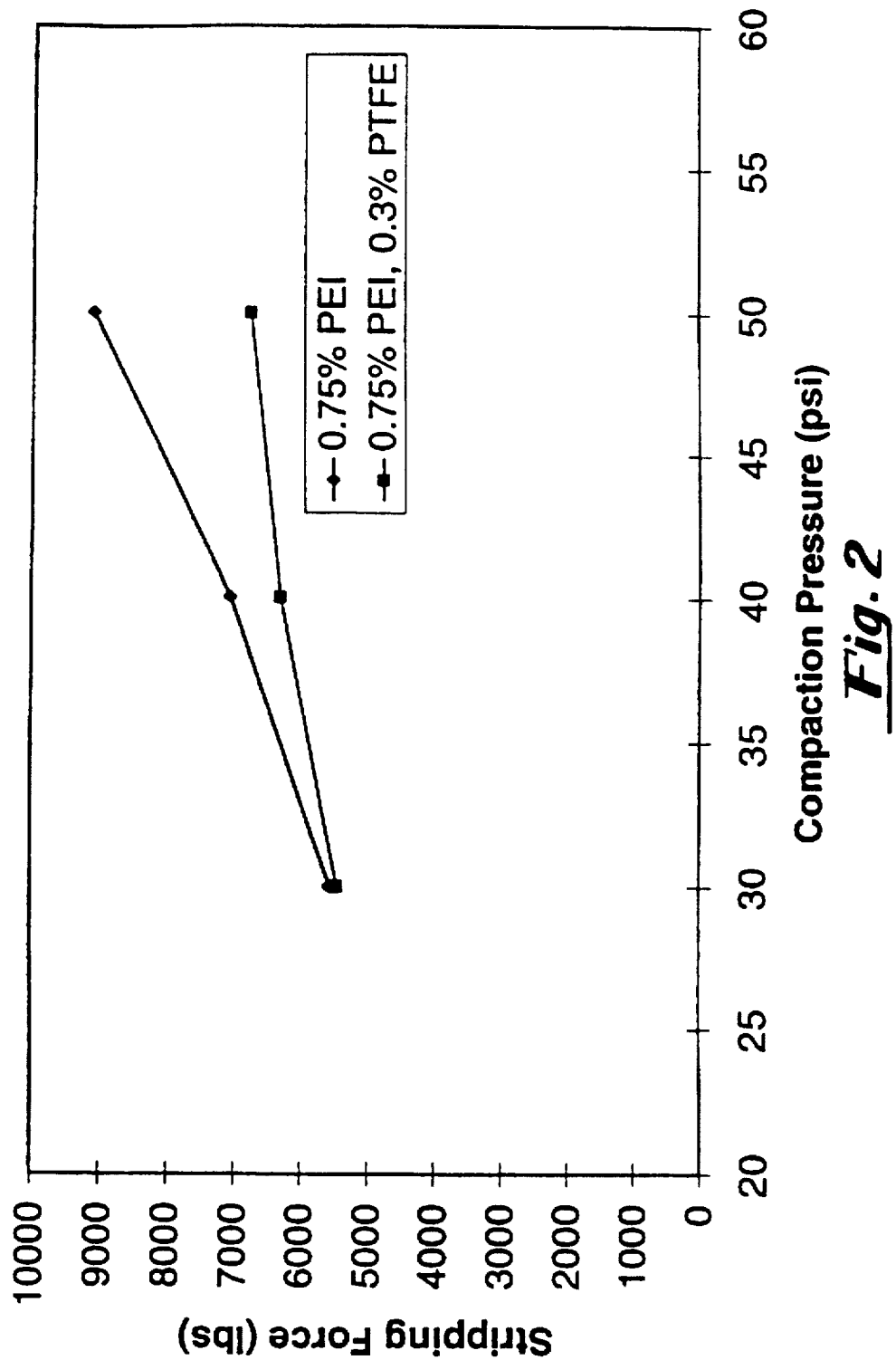
FIGS. 2 and 3 are graphical representations of the strip and slide ejection forces measured on toroids compacted from the powder compositions of the invention, as a function of compaction pressure. Toroids were made both from an iron-based powder composition of the invention (described in Example 1) and an iron-based powder composition formulated without PTFE. The addition of 0.3% PTFE significantly reduces the ejection forces of the compacts.
Figure 3:
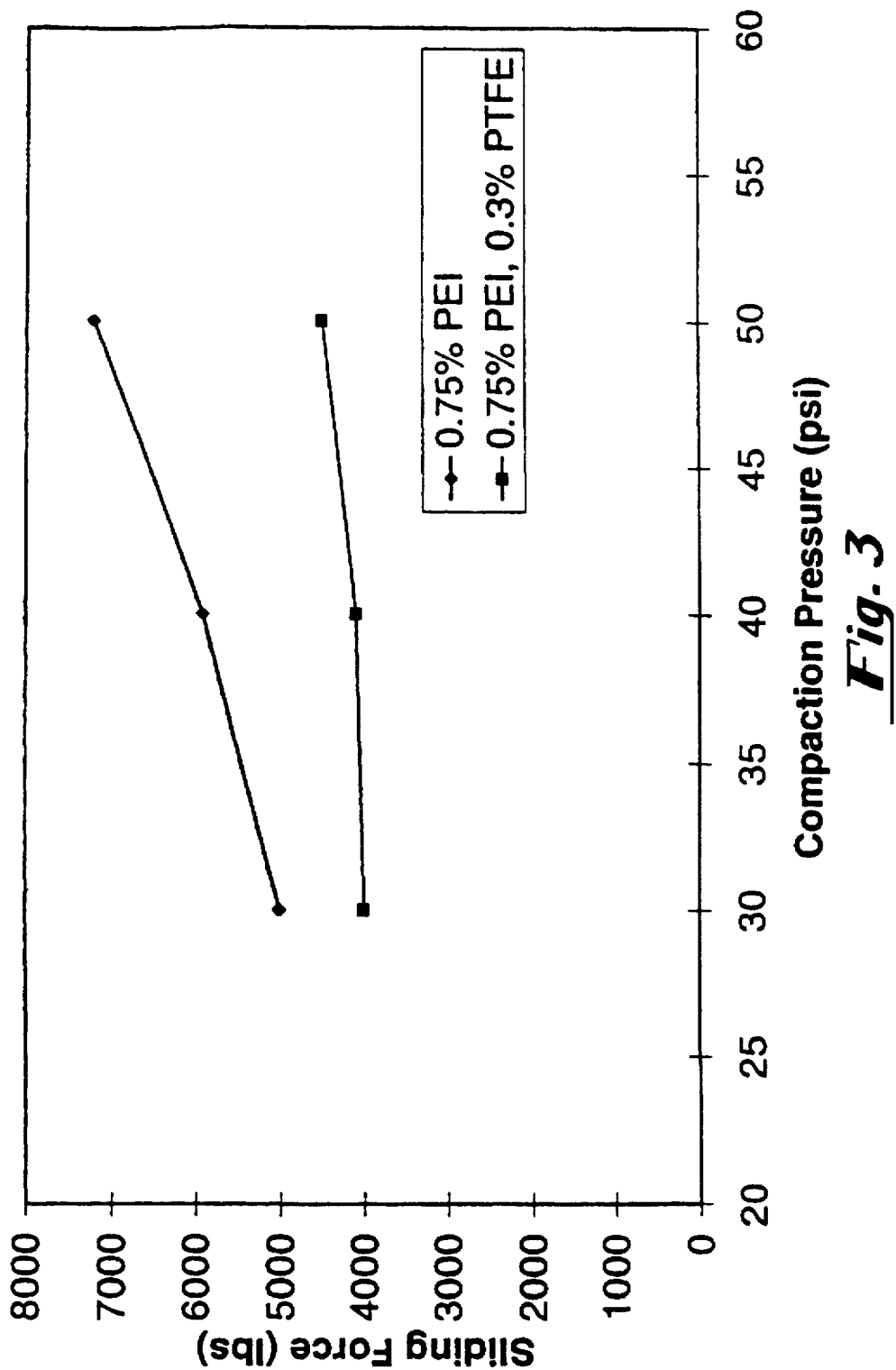
Figure 5:
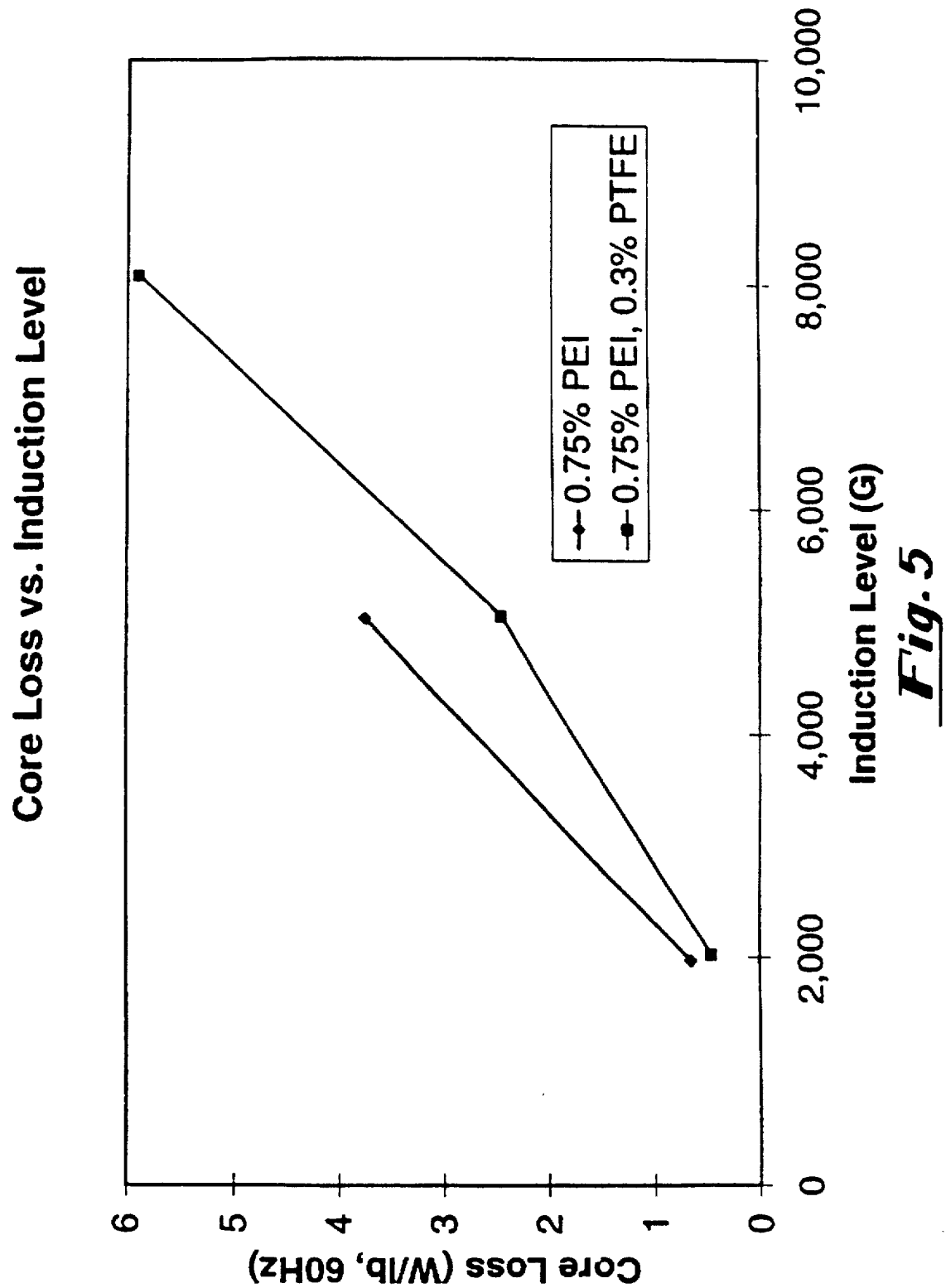
FIG. 5 is a graphical representation of core loss (at 60 Hz) as a function of induction level for an iron-based powder composition of the invention (described in Example 1) and an iron-based powder composition formulated without PTFE. The addition of PTFE lowers the total core loss.

Toroid compacts were prepared from each of Mixtures 1 and 2, in a die preheated to 525° F. (~274° C.), using compacting pressures of 30, 40, and 50 tons per square inch (tsi). The toroids were prepared for magnetic testing by wrapping them with 35 primary and 35 secondary turns of #28AWG wire. Magnetic hysteresis loops were generated on an LDJ Model 3500 Hysteresigraph at 60 Hz and peak induction levels of 2000, 5000, and where achievable, 8000 gauss. The magnetic properties and ejection forces (strip and slide forces) for each of the toroid compacts (prepared from Mixtures 1 and 2) were evaluated. The results are depicted in FIGS. 2, 3, and 5.

Figure 4:
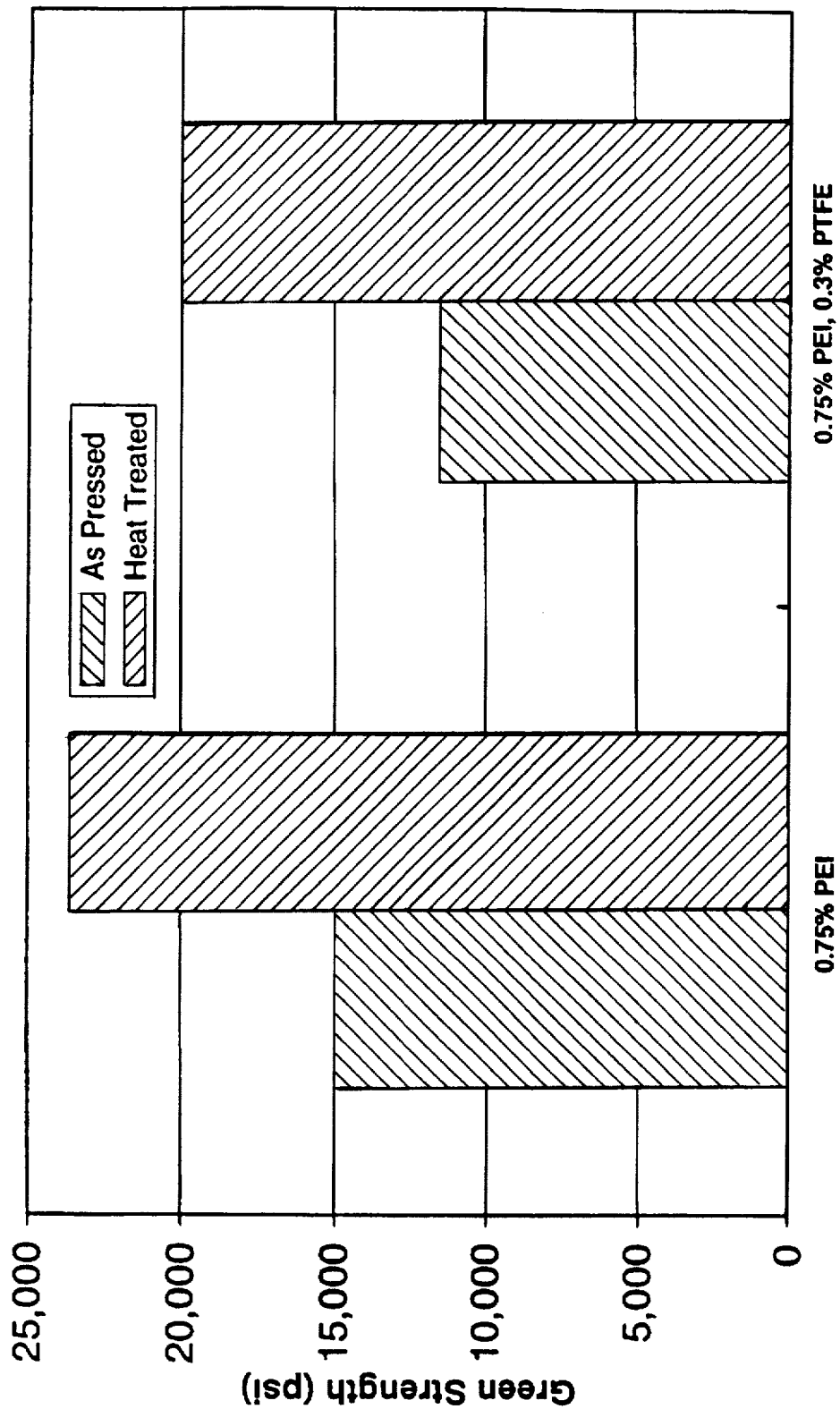
FIG. 4 depicts, in bar graph form, the green strength, with and without heat treatment, for compacts produced from an iron-based powder composition of the invention (described in Example 1) and an iron-based powder composition formulated without PTFE. The addition of 0.3% PTFE reduces the green strength of the compacts by only about 20%.

Transverse rupture strength (TRS) was examined on samples prepared from each of Mixtures 1 and 2 that were compacted in a die preheated to 525° F. (~274° C.) using a 40 tsi compaction pressure. The strength of these samples was then determined (MPIF Test Stand #15). These results are depicted in FIG. 1. A portion of the TRS bars from each of Mixtures 1 and 2 was heat treated for 1 hour at 600° F. in air before being evaluated for green strength. These results are depicted in FIG. 4.

What is claimed is:

1. A ferromagnetic powder composition for molding magnetic components comprising:
   a) an admixture of iron-based particles and a thermoplastic material, wherein said thermoplastic material constitutes about 0.001 to about 15% by weight of the total weight of the admixture; and
   b) a fluoric resin further admixed with said admixture (a), wherein said fluoric resin constitutes about 0.001 to about 2.0% by weight of the total weight of the admixture (a).

2. The composition of claim 1 wherein said iron-based particles of said admixture (a) have an average weight particle size of about 10 to about 250 microns.

3. The composition of claim 2 wherein said fluoric resin (b) is selected from the group consisting of polytetrafluoroethylene, tetrafluoroethylene-hexafluoropropylene copolymers, polyvinylidene fluoride, fluorinated ethylene propylene, perfluoralkoxy resin, ethylene-chlorotrifluoroethylene copolymers, ethylene-tetrafluoroethylene copolymers, and combinations thereof.

4. The composition of claim 1 wherein the thermoplastic material of said admixture (a) is selected from the group consisting of polyethersulfone, polyetherimide, polycarbonate, polyphenylene ether, polyethylene glycols, polyvinyl acetate, polyvinyl alcohol, and combinations thereof.

5. The composition of claim 4 wherein said fluoric resin (b) is selected from the group consisting of polytetrafluoroethylene, tetrafluoroethylene-hexafluoropropylene copolymers, polyvinylidene fluoride, fluorinated ethylene propylene, perfluoralkoxy resin, ethylene-chlorotrifluoroethylene copolymers, ethylene-tetrafluoroethylene copolymers, and combinations thereof.

6. The composition of claim 4 wherein said fluoric resin (b) comprises polytetrafluoroethylene.

7. The composition of claim 1 wherein the thermoplastic material of said admixture (a) consists essentially of polyetherimide and constitutes about 0.75% by weight of the total weight of said admixture (a); the iron-based particles of said admixture (a) have a weight average particle size of about 10 to about 350 microns; and the fluoric resin (b) consists essentially of polytetrafluoroethylene and constitutes about 0.3% by weight of the total weight of said admixture (a).

8. The composition of claim 7 wherein the iron-based particles have an average weight particle size of about 1 to about 250 microns.

9. A metallurgical compact prepared from the composition of claim 1.

10. A metallurgical compact prepared from the composition of claim 2.

11. A metallurgical compact prepared from the composition of claim 3.

12. A metallurgical compact prepared from the composition of claim 4.

13. A metallurgical compact prepared from the composition of claim 5.

14. A metallurgical compact prepared from the composition of claim 6.

15. A metallurgical compact prepared from the composition of claim 7.

16. A metallurgical compact prepared from the composition of claim 8.

* * * * *